US009463610B2

(12) United States Patent
Tsotsis

(10) Patent No.: US 9,463,610 B2
(45) Date of Patent: Oct. 11, 2016

(54) DENSE BARRIER-COATING SYSTEM AND METHOD

(71) Applicant: The Boeing Company, Chicago, IL (US)

(72) Inventor: Thomas Karl Tsotsis, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 205 days.

(21) Appl. No.: 14/325,354

(22) Filed: Jul. 7, 2014

(65) Prior Publication Data

US 2014/0318689 A1 Oct. 30, 2014

Related U.S. Application Data

(62) Division of application No. 12/463,341, filed on May 8, 2009, now Pat. No. 8,778,498.

(51) Int. Cl.
| | |
|---|---|
| *B32B 37/14* | (2006.01) |
| *B32B 38/00* | (2006.01) |
| *B32B 7/02* | (2006.01) |
| *B32B 15/06* | (2006.01) |
| *B32B 15/08* | (2006.01) |
| *B32B 27/06* | (2006.01) |
| *B32B 27/28* | (2006.01) |

(52) U.S. Cl.
CPC ............ *B32B 37/144* (2013.01); *B32B 7/02* (2013.01); *B32B 15/06* (2013.01); *B32B 15/08* (2013.01); *B32B 27/06* (2013.01); *B32B 27/28* (2013.01); *B32B 27/283* (2013.01); *B32B 38/0012* (2013.01); *B32B 2038/0016* (2013.01); *B32B 2307/308* (2013.01); *B32B 2307/51* (2013.01); *B32B 2307/7244* (2013.01); *B32B 2605/18* (2013.01); *Y10T 428/12049* (2015.01); *Y10T 428/31504* (2015.04); *Y10T 428/31678* (2015.04)

(58) Field of Classification Search
CPC ....... B32B 37/114; B32B 7/02; B32B 15/06; B32B 15/08; B32B 27/06; B32B 27/28; B32B 27/283; B32B 38/0012
See application file for complete search history.

(56) References Cited

U.S. PATENT DOCUMENTS

| | | | |
|---|---|---|---|
| 4,230,293 A | 10/1980 | Hamm et al. | |
| 4,369,222 A | 1/1983 | Hedrick et al. | |
| 4,424,254 A * | 1/1984 | Hedrick ................. | B32B 15/08 428/215 |
| 5,575,956 A * | 11/1996 | Hermansen .............. | H01B 1/22 252/512 |
| 5,866,272 A | 2/1999 | Westre et al. | |
| 2002/0081921 A1 | 6/2002 | Vargo et al. | |

* cited by examiner

*Primary Examiner* — Daniel McNally

(57) ABSTRACT

A method of making a coated polymer-matrix composite (PMC) having high-temperature oxidation protection includes bonding a first surface of a flexible sublayer that is free of water to a first surface of a dry PMC substrate having a first coefficient of thermal expansion. The flexible sublayer includes an electrically conductive material in an effective amount to enable electrical conductivity of the flexible sublayer, and includes a low-modulus-of-elasticity material. The method includes heating the bonded flexible sublayer and the PMC substrate, and bonding a first surface of an oxygen-impervious, dense barrier-coating layer to a second surface of the flexible sublayer to form the coated PMC having high-temperature oxidation protection. The dense barrier-coating layer includes metallic materials and ceramic materials, each having a respective second coefficient of thermal expansion, and flexibility of the flexible sublayer protects the respective bonds when the first and second coefficients of thermal expansion are unequal.

20 Claims, 6 Drawing Sheets

DENSE BARRIER-COATING SYSTEM AND METHOD

CROSS-REFERENCE TO RELATED APPLICATIONS

The present application is a divisional of and claims priority to pending application Ser. No. 12/463,341, filed May 8, 2009, entitled DENSE BARRIER-COATING SYSTEM AND METHOD, the entire contents of which is incorporated herein by reference.

BACKGROUND

1) Field of the Disclosure

The disclosure relates to coatings for composites. In particular, the disclosure relates to fully dense barrier-coating systems and methods for composites.

2) Description of Related Art

Polymer-matrix composites (PMCs), such as high-temperature polymer-matrix composites (HTPMCs), are typically used in the aircraft and aerospace industry for the weight reductions they offer when used to replace metal components. However, exposure to high-temperatures (e.g., 350 degrees Fahrenheit to 700 degrees Fahrenheit) can reduce the mechanical properties of the PMCs and HTPMCs and can cause oxidative degradation of the PMCs and HTPMCs. For example, HTPMCs typically have limited lifetimes of approximately between 1000 hours and 3000 hours at such elevated temperatures, primarily due to oxidation reactions, which reactions severely degrade the HTPMCs. In an attempt to extend the lifetime of such PMCs and HTPMCs, known barrier coatings or layers which prevent, reduce, or inhibit the permeation of a selected substrate with a gas, vapor, chemical, and/or aroma have been developed for use with PMCs and HTPMCs. For example, known ceramic-based barrier coatings have been used with PMCs and HTPMCs. However, such known ceramic-based barrier coatings do not prevent thermo-oxidative degradation, do not prevent oxygen diffusion, and, if exposure times are sufficiently long, do not adequately reduce temperature. Moreover, such known ceramic-based barrier coatings have not demonstrated desired ranges of durability in high-flow airstreams, such as encountered in exhaust-washed aircraft structures. In addition, such known ceramic-based barrier coatings have coefficients of thermal expansion (CTEs) that are sufficiently different from PMCs and HTPMCs and can cause strain mismatch between the ceramic-based barrier coating and the PMC or HTPMC substrate that can cause the coating to crack or spall, thereby exposing the substrate to the environment, thus resulting in degradation of the PMC or HTPMC.

In addition, known oxygen-barrier coatings exist for use with PMCs and HTPMCs. However, such known oxygen-barrier coatings cannot withstand use at elevated temperatures in the 350-degree Fahrenheit to 700-degree Fahrenheit range for extended periods without cracking, spalling, debonding, and/or eroding.

In addition, known metal-based barrier coatings exist for use with PMCs and HTPMCs. However, such known metal-based coatings have coefficients of thermal expansion (CTEs) that are sufficiently different from PMCs and HTPMCs and can cause strain mismatch between the metal-based barrier coating and the PMC or HTPMC substrate, that can cause the coating to crack or spall, thereby exposing the substrate to the environment, thus resulting in degradation of the PMC or HTPMC.

Accordingly, there is a need for a dense barrier-coating system and method that provide advantages over known coatings and systems.

SUMMARY

This need for a dense barrier-coating system and method is satisfied. Unlike known coating systems and methods, embodiments of the coating system and method of the disclosure may provide one or more of the following advantages: provide a dense barrier-coating system and method that is durable and that protect PMCs and HTPMCs from thermo-oxidative degradation; provide a dense barrier-coating system and method that prevents oxygen ingression into the PMC or HTPMC to prevent oxidation using an intermediate layer or layers that flexibly bond(s) the barrier coating to the PMC or HTPMC while accommodating differences in coefficients of thermal expansion (CTEs) to prevent the coating from cracking, separating, or debonding from the substrate at elevated temperatures; provide a dense barrier-coating system and method that reduces thermal energy transfer to the PMC or HTPMC substrate to reduce nominal substrate temperature, which increases the lifespan of the PMC or HTPMC; provide a dense barrier-coating system and method that prevents oxidation of PMCs and HTPMCs at elevated temperatures to extend their lifetime from between about 1000 hours to 3000 hours to as high as between about 10,000 hours to 15,000 hours and even as high as about 60,000 hours; provide a dense barrier-coating system and method that results in lowering the temperature of structures adjacent to the barrier-coated PMCs and HTPMCs, which decreases the need for insulation materials, which, in turn, lowers costs and increases weight savings; provide a dense barrier-coating system and method that can be used with aircraft, spacecraft, watercraft, and other craft, engine and blown-flap, exhaust-washed structures, warm-structure components for high-performance supersonic, hypersonic, and space re-entry vehicle structures, and propulsion systems such as power-generation turbines, vehicle engines, alternative-energy applications, and related technologies; provide a dense barrier-coating system and method that enable commercial and military use in a wide variety of long-duration, high-temperature, and high-flow-rate environments; provide a dense barrier-coating system and method that is impermeable to oxygen, durable and resistant to cracking, spalling, debonding, corrosion, and erosion during normal use, thermo-oxidatively stable at an application temperature, and applicable in an affordable manner; and, provide a dense barrier-coating system and method that can reduce the structural weight of the barrier-coated PMCs and HTPMCs by an estimated 20% to 25%, thus resulting in longer range, lower fuel costs, higher cargo capacities, and improved operational performance capability.

In an embodiment of the disclosure, there is provided a dense barrier-coating system for use with a dry polymer-matrix composite (PMC) substrate having a first coefficient of thermal expansion. The system comprises a flexible sublayer free of water, wherein a first surface of the flexible sublayer is bonded to a first surface of the PMC. The system further comprises an oxygen-impervious, dense barrier-coating layer, wherein a first surface of the oxygen-impervious, dense barrier-coating layer is bonded to a second surface of the flexible sublayer, and further wherein the oxygen-impervious dense barrier-coating layer is selected from the group consisting of metallic materials and ceramic materials each having a respective second coefficient of thermal expansion. The flexibility of the flexible sublayer protects the respective bonds when the first and second coefficients of thermal expansion are unequal.

In another embodiment of the disclosure, there is provided a dense barrier-coating system prepared by electrodeposition and used with a dry polymer-matrix composite (PMC) substrate having a first coefficient of thermal expansion. The system comprises a flexible sublayer free of water, wherein a first surface of the flexible sublayer is bonded to a first surface of the PMC, and further wherein the flexible sublayer includes an electrically conductive material in an effective amount to enable electrical conductivity of the flexible sublayer. The system further comprises an oxygen-impervious, dense, metallic barrier-coating having a second coefficient of thermal expansion, wherein a first surface of the oxygen-impervious, dense, metallic barrier-coating layer is bonded to a second surface of the flexible sublayer. The flexibility of the flexible sublayer protects the respective bonds when the first and second coefficients of thermal expansion are unequal.

In another embodiment of the disclosure, there is provided an aircraft comprising a dry polymer-matrix composite (PMC) substrate having a first coefficient of thermal expansion, a flexible sublayer free of water, wherein a first surface of the flexible sublayer is bonded to a first surface of the PMC, and an oxygen-impervious, dense barrier-coating layer, wherein a first surface of the oxygen-impervious, dense barrier-coating layer is bonded to a second surface of the flexible sublayer, and further wherein the oxygen-impervious, dense barrier-coating layer is selected from the group consisting of metallic materials and ceramic materials each having a respective second coefficient of thermal expansion. The flexibility of the flexible sublayer protects the respective bonds when the first and second coefficients of thermal expansion are unequal.

In another embodiment of the disclosure, there is provided a method of making a coated polymer-matrix composite (PMC) having high-temperature oxidation protection. The method comprises the step of providing a dry polymer-matrix composite (PMC) substrate having a first coefficient of thermal expansion. The method further comprises the step of bonding a first surface of a flexible sublayer that is free of water to a first surface of the PMC, wherein the flexible sublayer includes an electrically conductive material in an effective amount to enable electrical conductivity of the flexible sublayer, and further wherein the flexible sublayer includes a low-modulus-of-elasticity material selected from the group consisting of elastomers, silicones, silanes, siloxanes, and silazanes. The method further comprises the step of heating the bonded flexible sublayer and the PMC substrate. The method further comprises the step of bonding a first surface of an oxygen-impervious, dense barrier-coating layer to a second surface of the flexible sublayer, wherein the oxygen-impervious, dense barrier-coating layer is selected from the group consisting of metallic materials and ceramic materials each having a respective second coefficient of thermal expansion, and further wherein flexibility of the flexible sublayer protects the respective bonds when the first and second coefficients of thermal expansion are unequal.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The disclosure provides for a fully dense barrier-coating system and method that protects polymer-matrix composites (PMCs) and high-temperature polymer-matrix composites (HTPMCs) from thermo-oxidative degradation. For purposes of this application, "fully dense" means that oxygen and moisture cannot penetrate the coating. The system and method of the disclosed embodiments may be used on PMCs and HTPMCs for aircraft, spacecraft, watercraft, and other craft, engine and blown-flap, exhaust-washed structures, warm-structure components for high-performance supersonic, hypersonic, and space re-entry vehicle structures, and propulsion systems such as power-generation turbines, vehicle engines, alternative-energy applications, and related technologies. Accordingly, one of ordinary skill in the art will recognize and appreciate that the system and method of the disclosure can be used in any number of applications involving such vehicles and structures.

Figure 1:
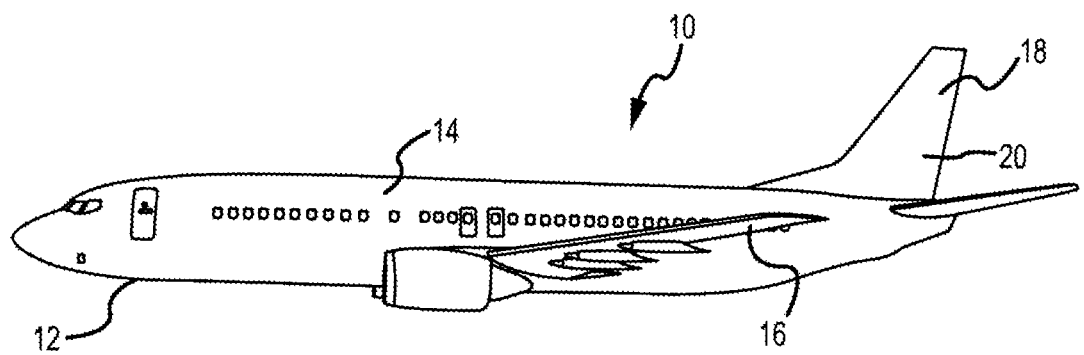
FIG. 1 is an illustration of an aircraft in which the advantageous embodiments of the system and method of the disclosure may be implemented.

Referring more particularly to the drawings, FIG. 1 is an illustration of an aircraft 10 in which advantageous embodiments of the system and method of the disclosure may be implemented, for example, a dense barrier-coating system 20 (see FIG. 2), or other embodiments of the system and method of the disclosure. FIG. 1 shows the aircraft 10 comprising an aircraft structure 12 including an elongated body 14, at least one wing 16 extending laterally from the body 14, and at least one tail 18 extending longitudinally from the body 14.

Figure 2:
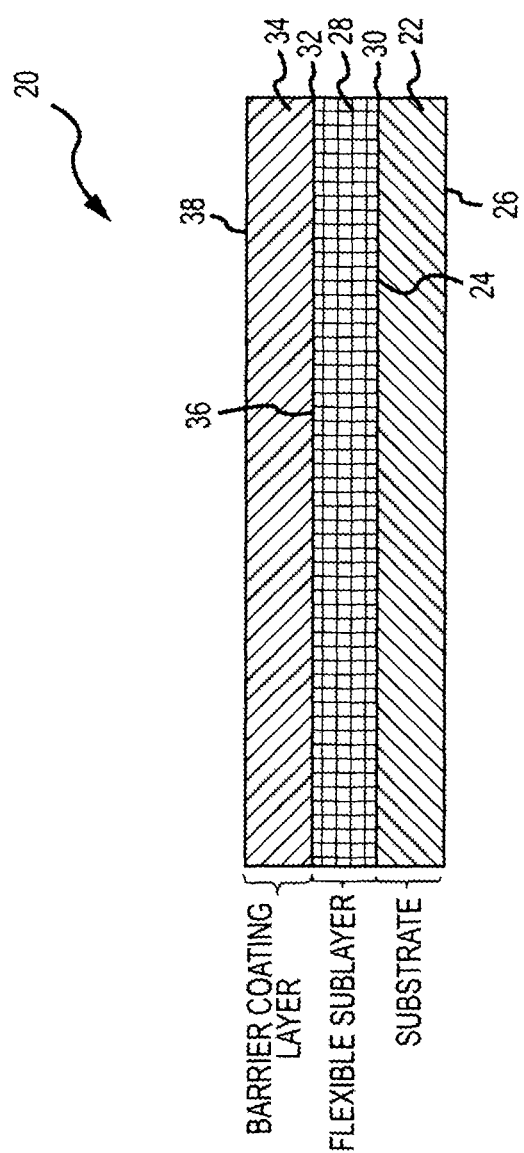
FIG. 2 is an illustration of one of the embodiments of a dense barrier-coating system of the disclosure.

FIG. 2 is an illustration of one of the embodiments of a dense barrier-coating system 20 of the disclosure. The dense barrier-coating system 20 is used with a dry polymer-matrix composite (PMC) substrate 22 having a first coefficient of thermal expansion (CTE). For purposes of this application, the coefficient of thermal expansion is defined as the change in dimension per unit change in temperature for a given material. Different materials have different rates of expansion. The lower the coefficient of thermal expansion, the less change in size the material goes through when it is subjected to temperature changes. The coefficient of thermal expansion is typically measured in the unit $k^{-1}$ expansion in parts per million (ppm) per degrees Celsius (° C.) in temperature. The PMC substrate 22 may comprise a polyimide HTPMC, a bismaleimide HPTMC, inorganic polymers, other high-temperature polymers such as polybenzoxazoles, polybenzoxazines, polyetheretherketones, or other suitable PMCs. The CTEs of typical polyimides may be in the range of from about 20 ppm to about 70 ppm/° C. The CTEs of typical inorganic polymers may be in the range of from about 5 ppm to about 300 ppm/° C. The CTEs of typical organic polymers may be in the range of from about 15 ppm to about 100 ppm/° C. The PMC substrate 22 has a first surface 24 and a second surface 26. The dense barrier-coating system 20 further comprises a flexible sublayer 28 that is free of water. The flexible sublayer 28 has a first surface 30 and a second surface 32. The first surface 30 of the flexible sublayer 28 is bonded to the first surface 24 of the PMC substrate 22. The first surface 24 of the PMC substrate 22 may be treated to ensure an excellent bond between the flexible sublayer 28 and the PMC substrate 22. The first surface 24 of the PMC substrate 22 may be treated with one of the following exemplary treatments or another suitable treatment to optimize bonding reactivity with the first surface 30 of the flexible sublayer 28: chemical etching to make the PMC substrate 22 and the flexible sublayer 28 chemically compatible, making the surface acidic or basic to enhance the reactivity, making the surface polar so it is charged to improve reactivity, functionalizing the surface by placing reactive functional groups on the surface, abrading the surface, or a combination of such treatments to maximize the durability and effectiveness of the bond between the PMC substrate and the flexible sublayer or between adjacent flexible sublayers. The flexible sublayer 28 preferably comprises or includes a low-modulus-of-elasticity material comprising elastomers, silicones, silanes, siloxanes, silazanes, or other suitable low-modulus-of-elasticity materials. For purposes of this application, a modulus of elasticity is the Young's Modulus defined as the ratio of the uniaxial stress over the uniaxial strain in the range of stress in which the ration of stress (nominal) to corresponding strain is linear when a force is applied to it. The modulus of elasticity is typically measured pounds per square inch (psi). The modulus of elasticity for elastomers is typically less than 1500 psi. The modulus of elasticity for silicones is typically from about 1000 psi to about 2500 psi. The modulus of elasticity for polysilanes is typically from about 1000 psi to about 1200 psi. The modulus of elasticity for polysiloxanes is typically from about 1000 psi to about 1400 psi. The modulus of elasticity for polysilazanes is typically from about 1000 psi to about 1400 psi. The optimal low-modulus-of-elasticity is from about 1000 psi to about 1500 psi. The flexible sublayer 28 is preferably comprised of a suitable low-modulus-of-elasticity material capable of sustaining high (e.g., 100%-1000%) strain (or deformation) at low stresses (<1000 psi (pounds per square inch)). The flexible sublayer 28 is preferably an oxidation-stable material and may comprise combinations of materials such as room-temperature vulcanizing (RTV) silicone rubber or a highly-deformable inorganic material. The flexible sublayer 28 may include or comprise at least one electrically conductive material 62 (see FIG. 4) comprising carbon black, carbon nanofibers, carbon nanotubes, metallic whiskers, metallic materials, or another suitable electrically conductive material. The electrically conductive material is preferably in an effective amount to enable electrical conductivity of the flexible sublayer 28. The flexible sublayer 28 preferably has a thickness in the range of from about 0.5 micron to about 50 microns. More preferably, the flexible sublayer 28 has a thickness in the range of from about 1 micron to about 10 microns. Most preferably, the flexible sublayer 28 has a thickness in the range of from about 3 microns to about 5 microns. In other embodiments, the dense barrier-coating system 20 may comprise two or more additional flexible sublayers 28 bonded on top of each other in succession.

The dense barrier-coating system 20 further comprises an oxygen-impervious, dense barrier-coating layer 34. The oxygen-impervious, dense barrier-coating layer 34 has a first surface 36 and a second surface 38. The first surface 36 of the oxygen-impervious, dense barrier-coating layer 34 is bonded to the second surface 32 of the flexible sublayer 28. The first surface 24 of the PMC substrate 22 may be treated to ensure an excellent bond between the flexible sublayer 28 and the PMC substrate 22. The second surface 32 of the flexible sublayer 28 may be treated with one of the following exemplary treatments or another suitable treatment to optimize bonding reactivity with the first surface 36 of the oxygen-impervious, dense barrier-coating layer 34: chemical etching to make the PMC substrate 22 and the flexible sublayer 28 chemically compatible, making the surface acidic or basic to enhance the reactivity, making the surface polar so it is charged to improve reactivity, functionalizing the surface by placing reactive functional groups on the surface, or abrading the surface. The oxygen-impervious, dense barrier-coating layer 34 may comprise suitable metallic materials or ceramic materials. Each of the metallic materials and ceramic materials has a respective second coefficient of thermal expansion (CTE). The metallic material may comprise nickel, titanium, and alloys thereof, or another suitable metallic material. The CTE of nickel is 13.3 ppm/° C. The CTE of titanium is 8.9 ppm/° C. The CTEs of nickel alloys may be in the range of from about 10 ppm to about 20 ppm/° C. The CTEs of titanium alloys may be in the range of from about 8 ppm to about 10 ppm/° C. Some metals and alloys, like Invar 36 and Alloy 42 (both nickel-steel alloys), among others, may have CTEs in the range of 3-5 ppm/° C. The ceramic material may comprise ceramic thermal materials based on carbides, borides, nitrides, oxides, or another suitable ceramic material. The CTEs of ceramic carbides may be in the range of from about 3 ppm to about 7 ppm/° C. The CTEs of ceramic borides may be in the range of from about 5 ppm to about 10 ppm/° C. The CTEs of ceramic nitrides may be in the range of from about 3 ppm to about 10 ppm/° C. The CTEs of ceramic oxides may be in the range of from about 5 ppm to about 10 ppm/° C. The oxygen-impervious, dense barrier-coating layer 34 that includes one or more ceramic-based layers can reduce thermal energy transfer to the PMC substrate to reduce nominal substrate temperature, which can increases the lifespan of the PMC. The oxygen-impervious, dense barrier-coating layer 34 preferably has a thickness in the range of from about 1 micron to about 30 microns. More preferably, the oxygen-impervious, dense barrier-coating layer 34 has a thickness in the range of from about 1 micron to about 5 microns. Most preferably, the oxygen-impervious, dense barrier-coating layer 34 has a thickness in the range of from about 1 micron to about 3 microns. The flexibility of the flexible sublayer 28 protects the respective bonds (i.e., the bond between the PMC substrate 22 and the flexible sublayer 28 and the bond between the flexible sublayer 28 and the oxygen-impervious, dense barrier-coating layer 34) when the first and second coefficients of thermal expansion (CTE) are unequal by allowing relatively large strains to be accommodated at low stress levels. The use of a fully dense metallic and/or ceramic layer or layers as the dense barrier-coating layer or layered coatings prevents oxygen diffusion. When the dense barrier-coating layer is used in combination with the flexible, low-modulus-of-elasticity, or high-strain-capable intermediate flexible sublayer or sublayers, differences in CTEs or strain properties of the dense barrier-coating layer(s) and the PMC or HTPMC substrate can be accommodated to prevent debonding of the dense barrier-coating layer(s) from the PMC or HTPMC substrate. The flexible sublayer 28 mitigates the difference in the first and second coefficients of thermal expansion and reduces or eliminates the strain mismatch between the PMC substrate and the oxygen-impervious, dense barrier-coating layer 34, thus reducing or eliminating degradation of the PMC. The flexible sublayer 28 has properties that allow the oxygen-impervious, dense barrier-coating layer 34 to be well-bonded to the flexible sublayer 28. These properties may include electrical conductivity to allow for electrodeposition, or chemical compatibility such as provided by chemical etching and the like, to permit strong bonding between the oxygen-impervious, dense barrier-coating layer 34 and the flexible sublayer 28. The dense barrier-coating system 20 provides high-temperature oxidation protection of the PMC at a temperature in a range of from about 350 degrees Fahrenheit to about 700 degrees Fahrenheit. In addition, the dense barrier-coating system 20 provides an about 100-degrees-Fahrenheit temperature reduction of the PMC or HTPMC. The dense barrier-coating system 20 may further comprise one or more additional oxygen-impervious, dense barrier-coating layers bonded on top of each in succession with the bottom such dense barrier-coating layer bonded to the second surface 38 of the oxygen-impervious, dense barrier-coating layer 34. The dense barrier-coating system 20 may be prepared or manufactured by electrodeposition, vacuum deposition, chemical deposition, vapor deposition, plasma spraying, or another suitable deposition or bonding process.

Figure 3:
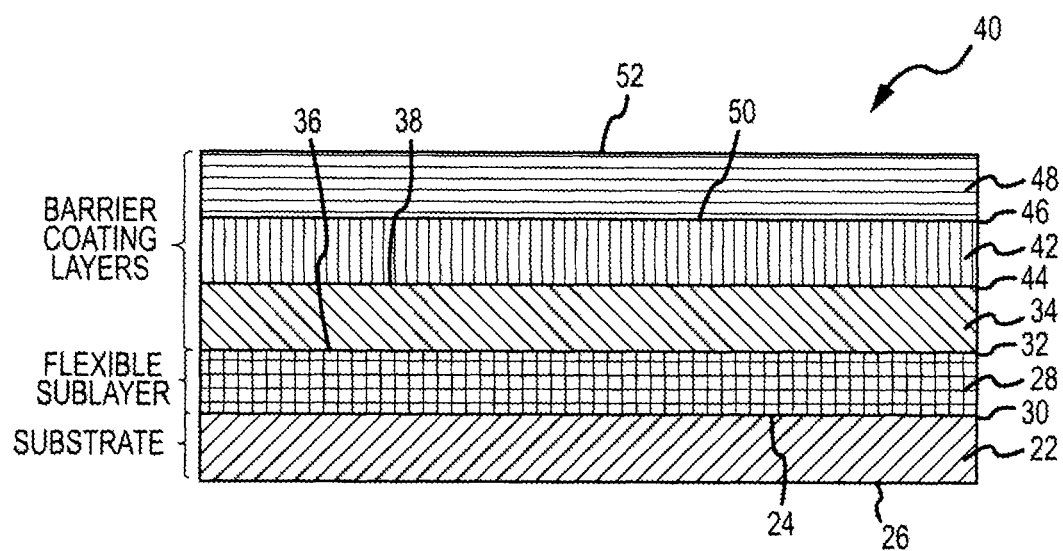
FIG. 3 is an illustration of another one of the embodiments of a dense barrier-coating system of the disclosure.

FIG. 3 is an illustration of another one of the embodiments of a dense barrier-coating system 40 of the disclosure. The dense barrier-coating system 40 comprises the PMC substrate 22, the flexible sublayer 28, and the oxygen-impervious, dense barrier-coating layer 34, as discussed above. The dense barrier-coating system 40 further comprises additional oxygen-impervious, dense barrier-coating layers 42, 48 bonded to the second surface 38 of the oxygen-impervious, dense barrier-coating layer 34. The oxygen-impervious, dense barrier-coating layer 42 has a first surface 44 and a second surface 46. The first surface 44 of the oxygen-impervious, dense barrier-coating layer 42 is bonded to the second surface 38 of the oxygen-impervious, dense barrier-coating layer 34. The oxygen-impervious, dense barrier-coating layer 48 has a first surface 50 and a second surface 52. The first surface 50 of the oxygen-impervious, dense barrier-coating layer 48 is bonded to the second surface 46 of the oxygen-impervious, dense barrier-coating layer 42. The dense barrier-coating system 40 may have additional oxygen-impervious, dense barrier-coating layers as well. The dense barrier-coating system 40 provides high-temperature oxidation protection of the PMC at a temperature in a range of from about 350 degrees Fahrenheit to about 700 degrees Fahrenheit. In addition, the dense barrier-coating system 40 provides an about 100-degrees-Fahrenheit temperature reduction of the PMC. The dense barrier-coating system 40 may be prepared or manufactured by electrodeposition, vacuum deposition, chemical deposition, vapor deposition, plasma spraying, or another suitable deposition or bonding process.

Figure 4:
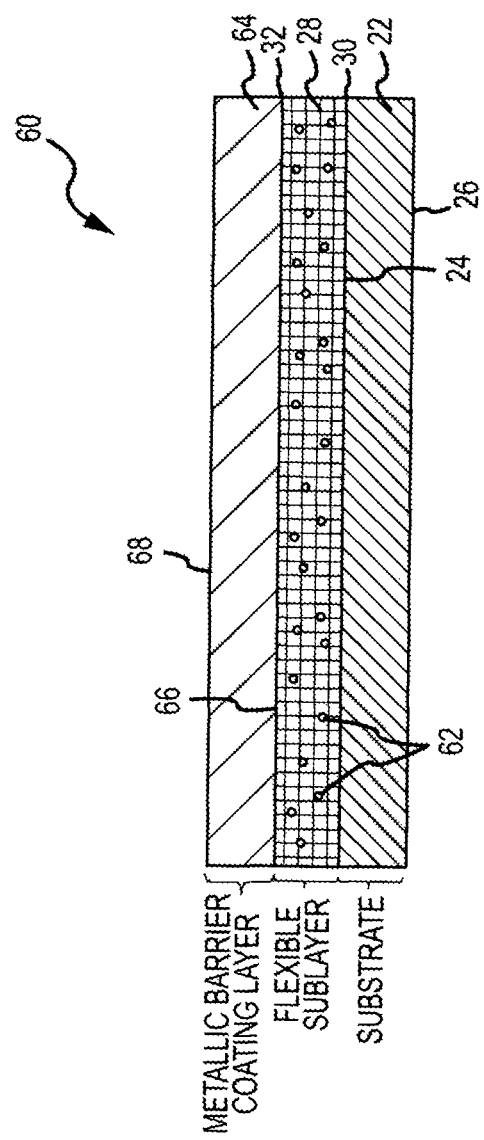
FIG. 4 is an illustration of another one of the embodiments of a dense barrier-coating system of the disclosure.

FIG. 4 is an illustration of another one of the embodiments of a dense barrier-coating system 60 of the disclosure. The dense barrier-coating system 60 is prepared by electrodeposition and is used with the dry polymer-matrix composite (PMC) substrate 22 having a first coefficient of thermal expansion as discussed above. The PMC substrate 22 has the first surface 24 and the second surface 26. The dense barrier-coating system 60 further comprises the flexible sublayer 28 that is free of water as discussed above. The flexible sublayer 28 has the first surface 30 and the second surface 32. The first surface 30 of the flexible sublayer 28 is bonded to the first surface 24 of the PMC substrate 22. In this embodiment as shown in FIG. 4, the flexible sublayer 28 comprises or includes an electrically conductive material 62 in an effective amount to enable electrical conductivity of the flexible sublayer 28. When the dense barrier-coating system 60 is prepared by electrodeposition, the flexible sublayer 28 needs to be made electrically conductive. When the flexible sublayer 28 is electrically conductive, it facilitates electrodeposition directly onto the flexible sublayer 28 with little or no surface treatment or preparation. The electrically conductive material 62 may comprise carbon black, carbon nanofibers, carbon nanotubes, metallic whiskers, metallic materials, or another suitable electrically conductive material. The flexible sublayer 28 having the electrically conductive material 62 may have a thickness in the range of from about 0.5 micron to about 50 microns. Preferably, the flexible sublayer 28 having the electrically conductive material 62 has a thickness in the range of from about 2 microns to about 4 microns. The dense barrier-coating system 60 further comprises an oxygen-impervious, dense, metallic barrier-coating layer 64 having a second coefficient of thermal expansion. The oxygen-impervious, dense, metallic barrier-coating layer 64 may comprise nickel, titanium, and alloys thereof or another suitable metallic material. The oxygen-impervious, dense, metallic barrier-coating layer 64 has a first surface 66 and a second surface 68. The first surface 66 of the oxygen-impervious, dense, metallic barrier-coating layer 64 is bonded to the second surface 32 of the flexible sublayer 28. The flexibility of the flexible sublayer 28 protects the respective bonds (i.e., the bond between the PMC substrate 22 and the flexible sublayer 28 and the bond between the flexible sublayer 28 and the oxygen-impervious, dense, metallic barrier-coating layer 64) when the first and second coefficients of thermal expansion are unequal by allowing relatively large strains to be accommodated at low stress levels. The flexible sublayer 28 mitigates the difference in the first and second coefficients of thermal expansion and reduces or eliminates the strain mismatch between the PMC substrate and the oxygen-impervious, dense, metallic barrier-coating layer 64, thus reducing or eliminating degradation of the PMC. The dense barrier-coating system 60 may further comprise one or more additional oxygen-impervious, dense, metallic barrier-coating layers bonded on top of each in succession with the bottom such dense, metallic barrier-coating layer bonded to the second surface 68 of the oxygen-impervious, dense, metallic barrier-coating layer 64. The dense barrier-coating system 60 provides high-temperature oxidation protection of the PMC at a temperature in a range of from about 350 degrees Fahrenheit to about 700 degrees Fahrenheit. In addition, the dense barrier-coating system 60 provides an about 100-degrees-Fahrenheit temperature reduction of the PMC.

Figure 5:
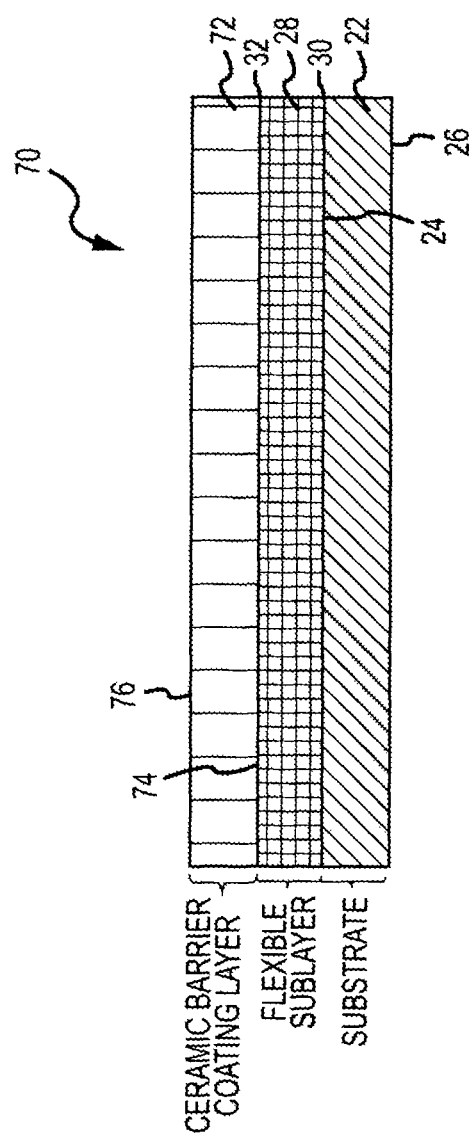
FIG. 5 is an illustration of another one of the embodiments of a dense barrier-coating system of the disclosure; and, FIG. 6 is an illustration of a flow diagram of one of the embodiments of a method of the disclosure.

FIG. 5 is an illustration of another one of the embodiments of a dense barrier-coating system 70 of the disclosure. The dense barrier-coating system 70 is used with the dry polymer-matrix composite (PMC) substrate 22 having a first coefficient of thermal expansion as discussed above. The PMC substrate 22 has the first surface 24 and the second surface 26. The dense barrier-coating system 70 further comprises the flexible sublayer 28 that is free of water as discussed above. The flexible sublayer 28 has the first surface 30 and the second surface 32. The dense barrier-coating system 70 further comprise an oxygen-impervious, dense, ceramic barrier-coating layer 72 having a second coefficient of thermal expansion. The oxygen-impervious, dense, ceramic barrier-coating layer 72 may comprise ceramic thermal materials based on carbides, borides, nitrides, oxides, or another suitable ceramic material. The oxygen-impervious, dense, ceramic barrier-coating layer 72 has a first surface 74 and a second surface 76. The first surface 74 of the oxygen-impervious, dense, ceramic barrier-coating layer 72 is bonded to the second surface 32 of the flexible sublayer 28. The flexibility of the flexible sublayer 28 protects the respective bonds (i.e., the bond between the PMC substrate 22 and the flexible sublayer 28 and the bond between the flexible sublayer 28 and the oxygen-impervious, dense, ceramic barrier-coating layer 72) when the first and second coefficients of thermal expansion are unequal by allowing relatively large strains to be accommodated at low stress levels. The flexible sublayer 28 mitigates the difference in the first and second coefficients of thermal expansion and reduces or eliminates the strain mismatch between the PMC substrate and the oxygen-impervious, dense, ceramic barrier-coating layer 72, thus reducing or eliminating degradation of the PMC. The dense barrier-coating system 70 may further comprise one or more additional oxygen-impervious, dense, ceramic barrier-coating layers bonded on top of each in succession with the bottom such oxygen-impervious, dense, ceramic barrier-coating layer bonded to the second surface 76 of the oxygen-impervious, dense, ceramic barrier-coating layer 72. The dense barrier-coating system 70 provides high-temperature oxidation protection of the PMC at a temperature in a range of from about 350 degrees Fahrenheit to about 700 degrees Fahrenheit. In addition, the dense barrier-coating system 70 provides an about 100-degrees-Fahrenheit temperature reduction of the PMC. The dense barrier-coating system 70 may be prepared or manufactured by electrodeposition, vacuum deposition, chemical deposition, vapor deposition, plasma spraying, or another suitable deposition or bonding process.

Figure 6:
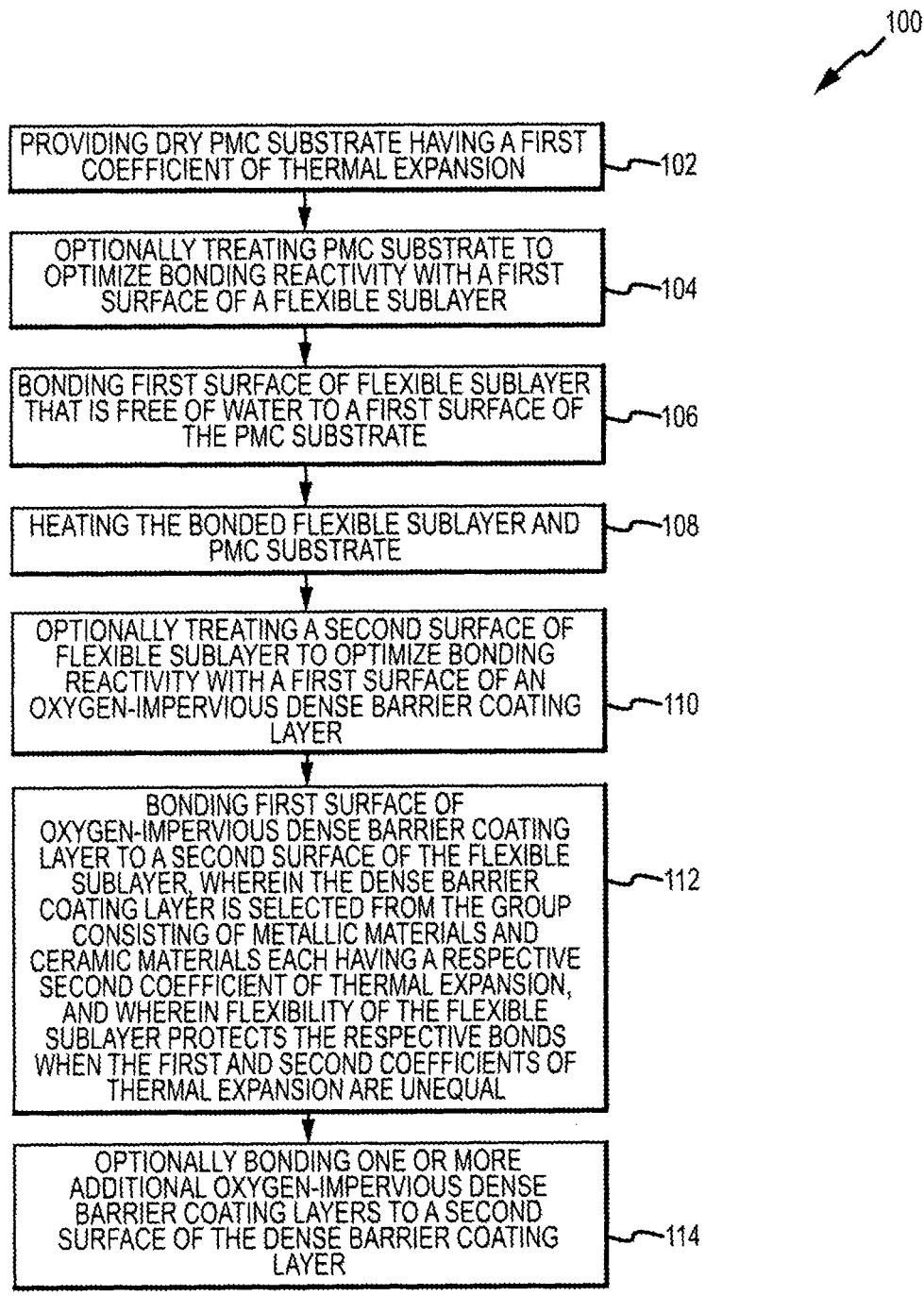

FIG. 6 is an illustration of a flow diagram of one of the embodiments of a method 100 of making a coated polymer-matrix composite (PMC) (see FIG. 1) having high-temperature oxidation protection, such as a PMC for use with aircraft, spacecraft, watercraft, and other craft, engine and blown-flap, exhaust-washed structures, warm-structure components for high-performance supersonic, hypersonic, and space re-entry vehicle structures, and propulsion systems such as power-generation turbines, vehicle engines, alternative-energy applications, and related technologies. The method 100 comprises step 102 of providing a dry polymer-matrix composite (PMC) substrate 22 (see FIGS. 2-5) having a first coefficient of thermal expansion. The method 100 further comprises optional step 104 of treating the first surface 24 of the PMC substrate 22 with a treatment such as chemical etching, abrading, or functionalizing, to optimize bonding reactivity with the first surface 30 of the flexible sublayer 28 (see FIGS. 2-5). The treatment step may comprise making the surface acidic or basic to enhance the reactivity, making the surface polar so it is charged to improve reactivity, functionalizing the surface by placing reactive functional groups on the surface, a combination of such treatments, or another suitable treatment. The method 100 further comprises step 106 of bonding the first surface 30 of the flexible sublayer 28 that is free of water to the first surface 24 of the PMC substrate 22 (see FIGS. 2-5). The flexible sublayer 28 preferably includes an electrically conductive material 62 (see FIG. 4) in an effective amount to enable electrical conductivity of the flexible sublayer 28. The flexible sublayer 28 further preferably comprises a low-modulus-of-elasticity material such as elastomers, silicones, silanes, siloxanes, silazanes, or other suitable low-modulus-of-elasticity materials. The method 100 may further comprise step 108 of heating the bonded flexible sublayer 28 and the PMC substrate 22 to remove any moisture that may be adsorbed or absorbed in the flexible sublayer 28 and the PMC substrate 22 to prevent the volatilization of such moisture into superheated steam during operation and to prevent any debonding and delamination of the dense barrier-coating system. The bonded flexible sublayer 28 and the PMC substrate 22 may be heated at an effective temperature for a sufficient period of time to remove any moisture, and the heating temperature depends on the type(s) of material or materials comprising the flexible sublayer 28 and the type(s) of material or materials comprising the PMC substrate 22. The method 100 further comprises optional step 110 of treating the second surface 32 of the flexible sublayer 28 with a treatment such as chemical etching, abrading, or functionalizing, to optimize bonding reactivity with the first surface 36 of the oxygen-impervious, dense barrier-coating layer 34 (see FIGS. 2-3). The treatment step may comprise making the surface acidic or basic to enhance the reactivity, making the surface polar so it is charged to improve reactivity, functionalizing the surface by placing reactive functional groups on the surface, a combination of such treatments, or another suitable treatment. The method 100 further comprises step 112 of bonding the first surface 36 of the oxygen-impervious, dense barrier-coating layer 34 to the second surface 32 of the flexible sublayer 28. The oxygen-impervious, dense barrier-coating layer 34 may comprise metallic materials or ceramic materials each having a respective second coefficient of thermal expansion. The flexibility of the flexible sublayer 28 protects the respective bonds when the first and second coefficients of thermal expansion are unequal by allowing relatively large strains to be accommodated at low stress levels. The method 100 further comprises optional step 114 of bonding one or more additional oxygen-impervious, dense barrier-coating layers 42, 48 (see FIG. 3) to the second surface 38 of the oxygen-impervious, dense barrier-coating layer 34 (see FIG. 3). Preferably, the method 100 uses electrodeposition for the bonding steps. The method 100 may also comprise optional curing and drying steps of one or more of the PMC substrate, the flexible sublayer, and/or the oxygen-impervious, dense barrier-coating layer.

In another embodiment of the disclosure, there is provided an aircraft 10 (see FIG. 1) having PMCs or HTPMCs coated with one of the dense barrier-coating systems 20 (or 40, 60, 70) discussed above. In an exemplary embodiment, as discussed above, the dense barrier-coating system 20 comprises the dry polymer-matrix composite (PMC) substrate 22 having a first coefficient of thermal expansion, the flexible sublayer 28 free of water, wherein the first surface 30 of the flexible sublayer 28 is bonded to the first surface 24 of the PMC 22, and the oxygen-impervious, dense barrier-coating layer 34, wherein the first surface 36 of the oxygen-impervious, dense barrier-coating layer 34 is bonded to the second surface 32 of the flexible sublayer 28.

The oxygen-impervious, dense barrier-coating layer 34 may comprise metallic materials or ceramic materials each having a respective second coefficient of thermal expansion. The flexibility of the flexible sublayer 28 protects the respective bonds when the first and second coefficients of thermal expansion are unequal by allowing relatively large strains to be accommodated at low stress levels.

The fully dense barrier-coating(s) and/or coating layers disclosed herein ensure the dense barrier-coating(s) layer(s) is/are impervious to oxygen, and the flexible intermediate sublayer or sublayers enable(s) accommodation of any CTE differential between the dense barrier-coating(s) layer(s) and PMC substrate. The embodiments of the system and method disclosed herein overcome the debonding and other types of degradation that occur from CTE/strain mismatch between the metal/ceramic/combination layer(s) and the PMC substrate. The flexible sublayer(s) accommodate(s) the strain mismatch between the materials at low stresses. Furthermore, the fully dense barrier-coating layer(s) provide(s) a durable barrier to prevent oxidation from occurring in the PMC or HTPMC at elevated temperatures.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of making a coated polymer-matrix composite (PMC) having high-temperature oxidation protection, the method comprising the steps of:
   bonding a first surface of a flexible sublayer that is free of water to a first surface of a dry polymer-matrix composite (PMC) substrate having a first coefficient of thermal expansion, wherein the flexible sublayer includes an electrically conductive material in an effective amount to enable electrical conductivity of the flexible sublayer, and further wherein the flexible sublayer includes a low-modulus-of-elasticity material selected from the group consisting of elastomers, silicones, silanes, siloxanes, and silazanes;
   heating the bonded flexible sublayer and the PMC substrate;
   bonding a first surface of an oxygen-impervious, dense barrier-coating layer to a second surface of the flexible sublayer to form the coated polymer-matrix composite (PMC) having high-temperature oxidation protection, wherein the oxygen-impervious, dense barrier-coating layer is selected from the group consisting of metallic materials and ceramic materials, each having a respective second coefficient of thermal expansion, and further wherein flexibility of the flexible sublayer protects the respective bonds when the first and second coefficients of thermal expansion are unequal; and
   bonding one or more additional oxygen-impervious, dense barrier-coating layers to a second surface of the oxygen-impervious, dense barrier-coating layer.

2. The method of claim 1 wherein the steps of bonding the first surface of the flexible sublayer and bonding the first surface of the oxygen-impervious, dense barrier-coating layer are performed using a process selected from the group consisting of electrodeposition, vacuum deposition, chemical deposition, vapor deposition and plasma spraying.

3. The method of claim 2 wherein the steps of bonding the first surface of the flexible sublayer and bonding the first surface of the oxygen-impervious, dense barrier-coating layer are performed using electrodeposition.

4. The method of claim 1 further comprising the step of reducing or eliminating degradation of the PMC substrate by the flexible sublayer reducing or eliminating strain mismatch between the PMC substrate and the oxygen-impervious, dense barrier-coating layer bonded to the second surface of the flexible sublayer.

5. The method of claim 1 further comprising before the step of bonding the first surface of the flexible sublayer, the step of treating the first surface of the PMC substrate with a treatment selected from the group consisting of chemical etching, abrading, and functionalizing, to optimize bonding reactivity with the first surface of the flexible sublayer.

6. The method of claim 1 further comprising before the step of bonding the first surface of the oxygen-impervious, dense barrier-coating layer, the step of treating the second surface of the flexible sublayer with a treatment selected from the group consisting of chemical etching, abrading, and functionalizing, to optimize bonding reactivity with the first surface of the oxygen-impervious, dense barrier-coating layer.

7. The method of claim 1 wherein the step of bonding the first surface of the flexible sublayer comprises bonding the first surface of the flexible sublayer including at least one electrically conductive material selected from the group consisting of carbon black, carbon nanofibers, carbon nanotubes, metallic whiskers, and metallic materials.

8. The method of claim 1 wherein the step of bonding the first surface of the flexible sublayer to the first surface of the dry polymer-matrix composite (PMC) substrate comprises bonding the first surface of the flexible sublayer to the first surface of the dry PMC substrate comprising a material selected from the group consisting of a polyimide HTPMC (high-temperature polymer-matrix composite), a bismaleimide HTPMC (high-temperature polymer-matrix composite), polybenzoxazole, polybenzoxazine, and polyetheretherketone.

9. The method of claim 1 wherein the step of heating the bonded flexible sublayer and the PMC substrate comprises heating the bonded flexible sublayer and the PMC substrate at an effective temperature for a sufficient period of time to remove any moisture to prevent volatilization of the moisture into superheated steam during operation and to prevent any debonding and delamination of the coated polymer-matrix composite (PMC).

10. The method of claim 1 wherein the step of bonding the first surface of the oxygen-impervious, dense barrier-coating layer comprises bonding the first surface of the oxygen-impervious, dense barrier-coating layer consisting of metallic materials selected from the group consisting of nickel, titanium, and alloys thereof.

11. A method of preparing a dense barrier-coating system for use with a dry polymer-matrix composite (PMC) substrate having a first coefficient of thermal expansion, the method comprising the steps of:
   bonding a first surface of a flexible sublayer that is free of water to a first surface of the dry polymer-matrix composite (PMC) substrate having the first coefficient of thermal expansion, wherein the flexible sublayer includes an electrically conductive material in an effective amount to enable electrical conductivity of the flexible sublayer, and further wherein the flexible sublayer includes a low-modulus-of-elasticity material selected from the group consisting of elastomers, silicones, silanes, siloxanes, and silazanes;

heating the bonded flexible sublayer and the PMC substrate;

bonding a first surface of an oxygen-impervious, dense barrier-coating layer to a second surface of the flexible sublayer such that the flexible sublayer is an intermediate layer between the oxygen-impervious, dense barrier-coating layer and the PMC substrate, and wherein the oxygen-impervious, dense barrier-coating layer is selected from the group consisting of metallic materials and ceramic materials, each having a respective second coefficient of thermal expansion, and further wherein flexibility of the flexible sublayer protects the respective bonds when the first and second coefficients of thermal expansion are unequal; and, bonding one or more additional oxygen-impervious, dense barrier-coating layers to a second surface of the oxygen-impervious, dense barrier-coating layer to form the dense barrier-coating system, wherein the dense barrier-coating system provides high-temperature oxidation protection of the PMC substrate at a temperature in a range of from about 350 degrees Fahrenheit to about 700 degrees Fahrenheit to extend a lifetime of the PMC from between about 1000 hours to about 15,000 hours.

12. The method of claim 11 further comprising before the step of bonding the first surface of the flexible sublayer, the step of treating the first surface of the PMC substrate with a treatment selected from the group consisting of chemical etching, abrading, and functionalizing, to optimize bonding reactivity with the first surface of the flexible sublayer.

13. The method of claim 11 further comprising before the step of bonding the first surface of the oxygen-impervious, dense barrier-coating layer, the step of treating the second surface of the flexible sublayer with a treatment selected from the group consisting of chemical etching, abrading, and functionalizing, to optimize bonding reactivity with the first surface of the oxygen-impervious, dense barrier-coating layer.

14. The method of claim 11 wherein the steps of bonding the first surface of the flexible sublayer and bonding the first surface of the oxygen-impervious, dense barrier-coating layer are performed using a process selected from the group consisting of electrodeposition, vacuum deposition, chemical deposition, vapor deposition and plasma spraying.

15. The method of claim 11 wherein the step of bonding the first surface of the flexible sublayer comprises bonding the first surface of the flexible sublayer including at least one electrically conductive material selected from the group consisting of carbon black, carbon nanofibers, carbon nanotubes, metallic whiskers and metallic materials.

16. The method of claim 11 further comprising the step of reducing or eliminating degradation of the PMC substrate by the flexible sublayer reducing or eliminating strain mismatch between the PMC substrate and the oxygen-impervious, dense barrier-coating layer bonded to the second surface of the flexible sublayer.

17. A method of reducing or eliminating degradation of a dry polymer-matrix composite (PMC) substrate having a first coefficient of thermal expansion, the method comprising the steps of:

preparing a dense barrier-coating system for use with the dry PMC substrate having the first coefficient of thermal expansion, the steps of preparing comprising:

bonding a first surface of a flexible sublayer that is free of water to a first surface of the dry PMC substrate having the first coefficient of thermal expansion, wherein the flexible sublayer includes an electrically conductive material in an effective amount to enable electrical conductivity of the flexible sublayer, and further wherein the flexible sublayer includes a low-modulus-of-elasticity material selected from the group consisting of elastomers, silicones, silanes, siloxanes, and silazanes;

heating the bonded flexible sublayer and the PMC substrate;

bonding a first surface of an oxygen-impervious, dense barrier-coating layer to a second surface of the flexible sublayer such that the flexible sublayer is an intermediate layer between the oxygen-impervious, dense barrier-coating layer and the PMC substrate, and wherein the oxygen-impervious, dense barrier-coating layer is selected from the group consisting of metallic materials and ceramic materials, each having a respective second coefficient of thermal expansion, and further wherein flexibility of the flexible sublayer protects the respective bonds when the first and second coefficients of thermal expansion are unequal; and, bonding one or more additional oxygen-impervious, dense barrier-coating layers to a second surface of the oxygen-impervious, dense barrier-coating layer to form the dense barrier-coating system, using the flexible sublayer to reduce or eliminate strain mismatch between the PMC substrate and the oxygen-impervious, dense barrier-coating layer bonded to the second surface of the flexible sublayer, and reducing or eliminating degradation of the dry PMC substrate.

18. The method of claim 17 wherein the step of preparing the dense barrier-coating system for use with the dry PMC substrate having the first coefficient of thermal expansion comprises preparing an aircraft dense-barrier coating system.

19. The method of claim 17 wherein the step of preparing the dense barrier-coating system for use with the dry PMC substrate having the first coefficient of thermal expansion comprises preparing the dense barrier-coating system to provide high-temperature oxidation protection of the PMC substrate at a temperature in a range of from about 350 degrees Fahrenheit to about 700 degrees Fahrenheit to extend a lifetime of the PMC from between about 1000 hours to about 15,000 hours.

20. The method of claim 17 wherein the steps of bonding the first surface of the flexible sublayer and bonding the first surface of the oxygen-impervious, dense barrier-coating layer are performed using a process selected from the group consisting of electrodeposition, vacuum deposition, chemical deposition, vapor deposition and plasma spraying.

* * * * *